(12) United States Patent
Ling

(10) Patent No.: US 8,062,524 B2
(45) Date of Patent: Nov. 22, 2011

(54) INTEGRATED OXIDATION DITCH

(75) Inventor: Jianjun Ling, Jiangsu (CN)

(73) Assignee: Yixing Lingzhi Environmental Co., Ltd., Heqiao Town, Yixing, Jiangsu (CN)

( * ) Notice: Subject to any disclaimer, the term of this patent is extended or adjusted under 35 U.S.C. 154(b) by 459 days.

(21) Appl. No.: 12/161,797

(22) PCT Filed: Jan. 5, 2007

(86) PCT No.: PCT/CN2007/000024
§ 371 (c)(1),
(2), (4) Date: Jul. 22, 2008

(87) PCT Pub. No.: WO2007/085176
PCT Pub. Date: Aug. 2, 2007

(65) Prior Publication Data
US 2010/0276349 A1    Nov. 4, 2010

(30) Foreign Application Priority Data

Jan. 5, 2007    (CN) .......................... 2006 2 0069080

(51) Int. Cl.
*C02F 3/00*    (2006.01)
(52) U.S. Cl. ........................................ 210/605; 210/926

(58) Field of Classification Search .................. 210/926, 210/605
See application file for complete search history.

(56) References Cited

U.S. PATENT DOCUMENTS

| | | | | | |
|---|---|---|---|---|---|
| 3,579,439 | A | * | 5/1971 | Meiring | 210/622 |
| 3,905,904 | A | * | 9/1975 | Cherne et al. | 210/195.1 |
| 3,964,998 | A | * | 6/1976 | Barnard | 210/605 |
| 4,226,717 | A | * | 10/1980 | Malm | 210/195.1 |
| 4,460,471 | A | * | 7/1984 | Reid | 210/629 |

OTHER PUBLICATIONS

English machine translation of CN03223656.5.*

* cited by examiner

*Primary Examiner* — Chester Barry
(74) *Attorney, Agent, or Firm* — Global IP Services; Tianhua Gu

(57) ABSTRACT

An integrated oxidation ditch comprises a number of oval channels. There are two or more circular zones in the central island of the oxidation ditch, wherein, the two circular zones are tangential to the inner wall or share the inner wall with an adjacent channel. Wastewater of different zones is connected with others. The center island is used sufficiently in the oxidation ditch and all the channels and the deposition zone or the deposition zone and an anaerobic zone, inner/outer re-circulation zone are integrated together. So the oxidation ditch improves space utilization efficiency and reduces the land and cost.

7 Claims, 3 Drawing Sheets

INTEGRATED OXIDATION DITCH

FIELD OF THE INVENTION

The practical and new invention relates to an oxidation ditch, pertaining to water treatment technical field, in particular, to an improved oxidation ditch integrating process of deposition and oxidation ditch.

BACKGROUND OF THE INVENTION

As a round or ellipse oxidation ditch, oxidation ditch comprises various ditches of double-channel one, triple-channel one, quadruple-channel one and so on, with a central island arranged in the center. Both sides and bottom of the central island are of concrete as well as the middle wall is of an integrated structure formed by segregating a ring girder of reinforcing steel bar and a brick wall. These ditches are generally arranged as an anaerobic area, an anoxic area and an aerobic area when designing oxidation ditch. Most of deposition tank equipped in the process is designed outside of the oxidation ditch, making the overall treatment device be incompact. For the purpose of saving investment and reducing area occupied, a treatment device came into being, wherein the deposition tank is designed at the central island position of oxidation ditch. As disclosed in the Chinese Patent No.CN03223656.5 that "A wastewater treatment device using A2/O oxidation ditch process", the device consists of an anaerobic tank, an anoxic tank, an oxidation ditch and a deposition tank, wherein the combination of the deposition tank and the oxidation ditch form the tank body in the shape of concentric double-walled cylinder with the oxidation ditch around the outer side, the deposition tank inside and the anoxic tank located outside of the oxidation ditch as well as very near to the anaerobic tank outside of the anoxic tank. Although this design saves the space between tanks, and the connecting pipes in shared walls between tank bodies, the round deposition tank at the central island is an individual one. The objectives of deposition and separation will be realized only when sufficient volume of the deposition tank is ensured. Cost of the deposition tank accounts for 10-20% of the total costs of oxidation ditch. In terms of whole facility, defects of large area occupied and excessively-high costs still exist. In addition, the flexibility of use is inadequate and the whole device will be down in case of repairing deposition tank.

If the central island position is designed as a separate anaerobic area or a separate oxidation ditch, neither of these two forms is, from the design angle, rather reasonable no matter for area occupied or layout arrangement.

SUMMARY OF THE INVENTION

It is an objective of the present invention to provide, exactly for overcoming the prior art shortcomings as described above, an integrated oxidation ditch characterized by much more reasonable layout, small area occupied, low cost investment and convenient for maintenance. And the major innovation lies in that at least two round areas are designed at the central island. The two round areas are tangential to or share the wall with the inner wall of the neighbouring oxidation ditch. In the same hydraulic retention time, the equipment saves civil work investment and decrease area occupied by oxidation ditch and deposition tank, making the equipment be more reasonable and overall structure work in a more harmonious manner. The shared wall further reduces the investment cost and area occupied. The embodiment includes: The integrated oxidation ditch, including several ellipse oxidation ditches, is characterized by two or more round areas being arranged at the central island of the oxidation ditch, wherein two round areas are tangential to or share the wall with the inner wall of neighbouring oxidation ditch as well as connection of process water of various areas.

Two or more round areas of the equipment can be arranged at random positions within the central island, rather desirable layout being that two round areas being located at both ends of the central island and tangential to or sharing wall with the inner wall of the neighbouring oxidation ditch, while the optimum one being sharing a semicircular wall, which saves most the costs and the layout is more reasonable.

All round areas at the central island position of the equipment can be designed as deposition areas and also as at least two deposition areas. Other round areas are anaerobic areas or inner/outer re-circulation zones. According to the principle that the deposition area requires longer retention time, the number of round area in the deposition area exceeds those of anaerobic area and inner/outer re-circulation zone. In this way, there is the equipment at least in two deposition areas being capable of meeting different requirements for hydraulic treatment and especially, being used in turn. In case of malfunction of the equipment, one is under repair, while the other is in use, without hindering operation of the whole system. If inner/outer re-circulation zone is placed, inner re-circulation zone or outer re-circulation zone can be placed individually or both. Partial water in the inner channel enters into deposition area via inner re-circulation zone and partial inner re-circulates into the outer channel in order to prolong the retention time of wastewater in the oxidation ditch. While outer re-circulation zone is connected with the deposition area and partial sludge of the deposition area can re-circulate into the outer channel via outer re-circulation zone so as to increase activated sludge content of the oxidation ditch and improve denitrification rate.

For the purpose of taking full advantage of remaining space of the central island and avoiding sludge expansion in the oxidation ditch, making it harmonize with other facilities, greatly reducing area occupied and improving flexibility of the whole equipment, using rather many shared walls, enormously saving costs and decreasing investment cost, a rather desirable method for the present practical and new invention is to place the anaerobic area or inner/outer re-circulation zone in the intermediate place formed by the round deposition area and the oxidation ditch wall.

Taking full advantage of central island position of traditional oxidation ditch, present practical and new invention introduces deposition area or deposition area and anaerobic area as well as inner/outer re-circulation zone, making overall equipment layout of the oxidation ditch be more harmonious and reasonable, space utilization ratio be high, area occupied be less and capital expenditure be lower. In particular, more than two deposition areas are arranged, increasing flexibility of equipment use, meeting the variation requirements for water flow and water quality, strengthening technical suitability, integrating aesthetics and practicality as well as being convenient for use.

DETAILED DESCRIPTION OF THE INVENTION

Figure 1:
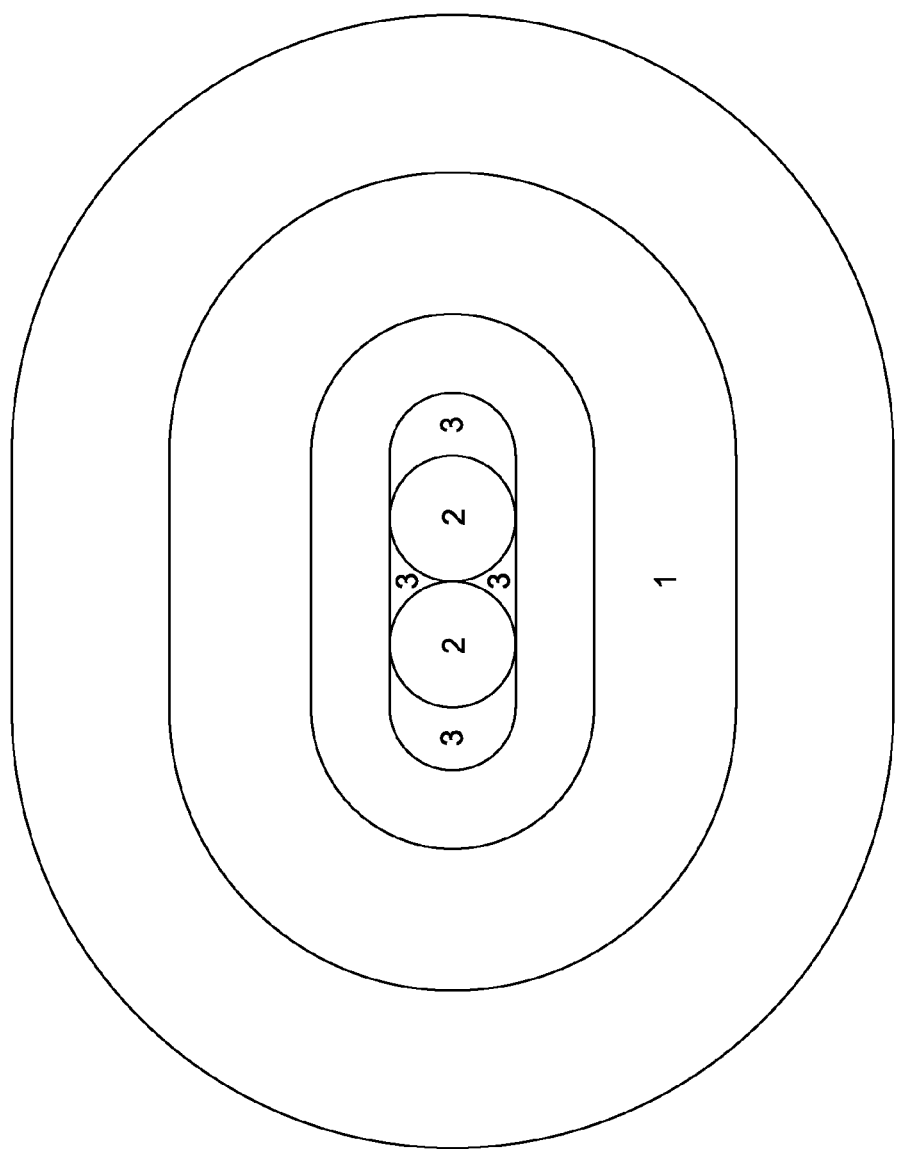
FIG. 1 is the schematic structural view of Embodiment 1 for the present practical and new invention.
Figure 2:
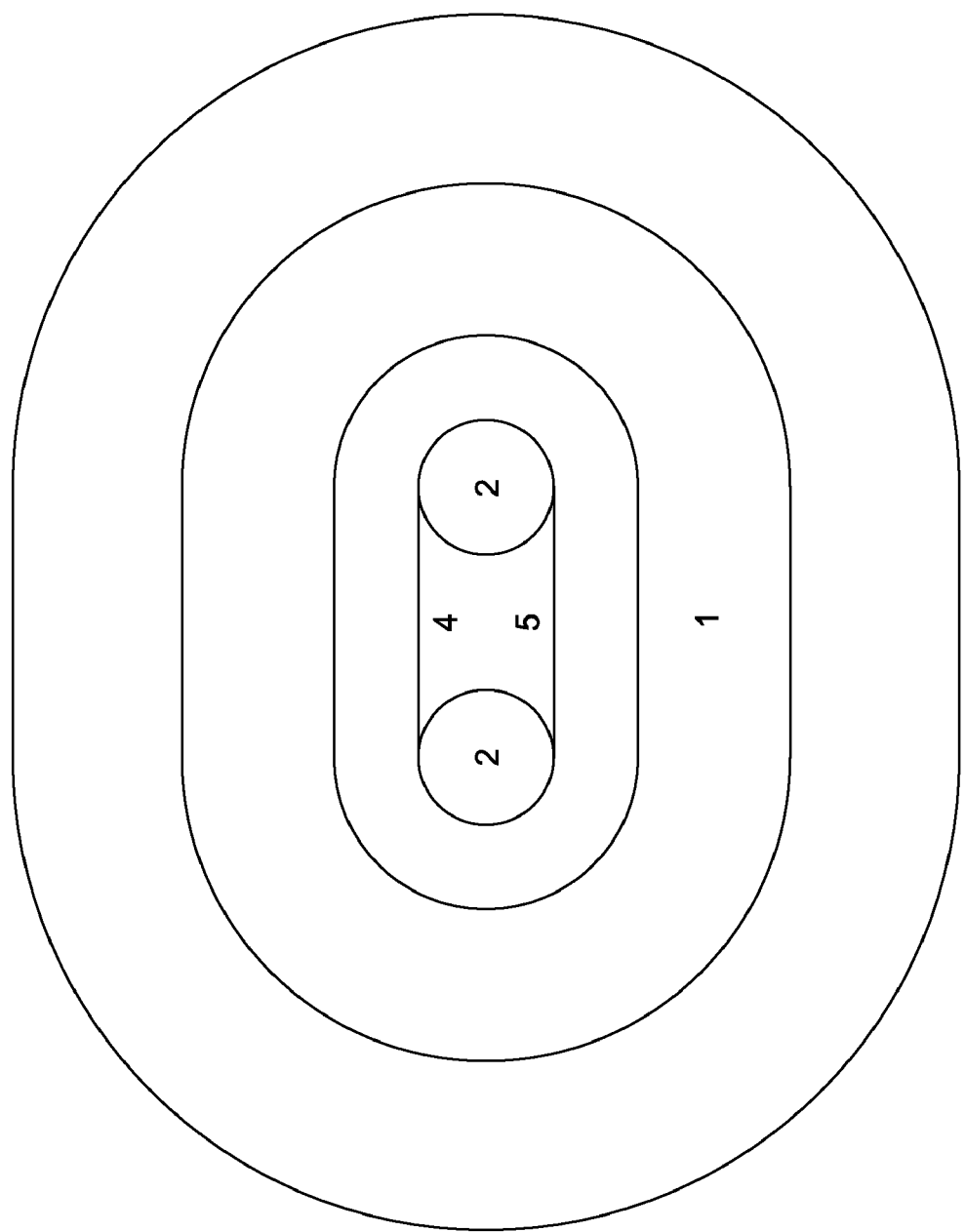
FIG. 2 is the s schematic structural view of Embodiment 2 for the practical and new invention.
Figure 3:
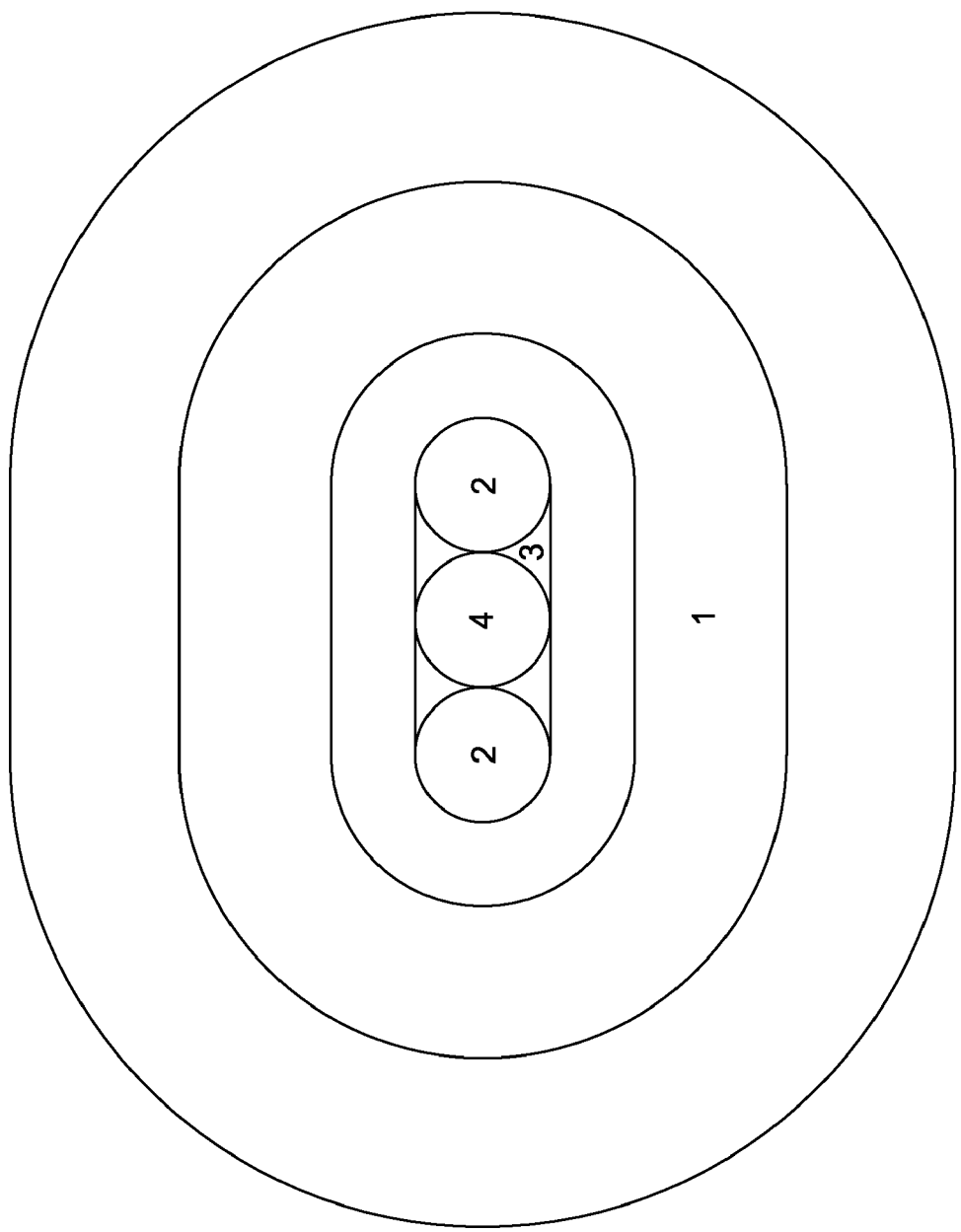
FIG. 3 is the schematic structural view of Embodiment 3 for the present practical and new invention.

In Embodiment 1, the integrated oxidation ditch comprises several ellipse oxidation ditches 1, at the central island position of which two round deposition areas 2 are arranged. The two round deposition areas 2 are tangential to the inner wall of the neighbouring oxidation ditch and they also form an intermediate space with the inner wall of oxidation ditch called anaerobic area 3 whose process water is connected to that of each oxidation ditch 1 and deposition area 2.

In Embodiment 2, the integrated oxidation ditch comprises several ellipse oxidation ditches 1. The central island position of the oxidation ditch is arranged with two round deposition areas 2 which share a semicircular wall with the inner wall of the neighbouring oxidation ditch. The intermediate space formed between the round deposition area 2 and the inner wall of the oxidation ditch is designed as inner re-circulation zone 4 and/or outer re-circulation zone 5. Process water of each oxidation ditch 1, inner re-circulation zone 4 and deposition area 2 is connected in turn. Outer channel of inner re-circulation zone 4 has re-circulation connection and outer re-circulation zone 5 is connected to deposition area 2 whose sludge is re-circulation connected by outer re-circulation zone 5 and the outer channel of the oxidation ditch.

In Embodiment 3, the integrated oxidation ditch comprises several ellipse oxidation ditches 1. The central island position of the oxidation ditch is arranged with three round areas, wherein, two round deposition areas 2 are arranged at both ends of the central island, sharing a semicircular wall with the inner wall of the neighbouring oxidation ditch. While the round area in the middle is tangential to the inner wall of oxidation ditch, forming inner re-circulation zone 4. The intermediate space formed by the three round areas and the inner wall of the oxidation ditch is designed as anaerobic area 3 whose process water is connected with that of each oxidation ditch 1, inner re-circulation zone 4 and deposition area 2. The inner re-circulation zone 4 also forms a wastewater re-circulation connection with the outer channel of the oxidation ditch.

For the above-mentioned equipment, investment in the additionally-arranged anaerobic area or inner/outer re-circulation zone has not been increased. It only utilizes the central island position or deposition area to make the effects of total denitrification becoming more remarkable. For some places without requirements for total nitrogen loss, pure anaerobic system is added, without adding the civil work investment of the original oxidation ditch, further removing main indexes of BOD and COD. For the places with requirements for total nitrogen loss, additional investment is unnecessary but to add one process only by saving investment, reaching economical objectives and moreover, saving area occupied. Wall of round tank shares a wall with the inner cambered path of inner ditch, enormously saving costs, occupying less area and making the layout be more reasonable compared with using one deposition tank in the middle.

What is claimed is:

1. An integrated oxidation ditch comprising:
several elliptical oxidation ditches;
a central elliptical island defined by the elliptical oxidation ditches;
at least two round deposition areas located in the central elliptical island and anaerobic areas or inner/outer re-circulation zones located in remaining areas of the central elliptical island; and
an interconnecting pipe system for connecting process waters of various areas.

2. The integrated oxidation ditch of claim 1, wherein said two round deposition areas are located at two ends of the central elliptical island, each round deposition area is tangential to or shares a wall with an inner wall of a neighboring oxidation ditch.

3. The integrated oxidation ditch of claim 2, wherein each round deposition area shares a semicircular wall with the inner wall of the neighboring oxidation ditch.

4. The integrated oxidation ditch of claims 1, wherein the anaerobic areas or inner/outer re-circulation zones are arranged at an intermediate space formed by two round deposition areas and a wall of neighboring oxidation ditch.

5. The integrated oxidation ditch of claim 4, wherein the inner/outer re-circulation zones are arranged as both are inner re-circulation zones only or both are outer re-circulation zones only.

6. The integrated oxidation ditch of claim 4, wherein the inner/outer re-circulation zones are arranged as one is inner re-circulation zone and other is outer re-circulation zone.

7. The integrated oxidation ditch of claim 6, wherein the inner re-circulation zone is connected with the inner channel of the oxidation ditch, the outer re-circulation zone is connected with the deposition area and both inner and outer re-circulation zones are connected with the outer channel of the oxidation ditch.

* * * * *